United States Patent
Hugosson et al.

(10) Patent No.: US 10,218,978 B2
(45) Date of Patent: Feb. 26, 2019

(54) DATA PROCESSING SYSTEMS

(71) Applicant: ARM Limited, Cambridge (GB)

(72) Inventors: Ola Hugosson, Lund (SE); Tomas Edsö, Lund (SE); Erik Persson, Lund (SE)

(73) Assignee: Arm Limited, Cambridge (GB)

( * ) Notice: Subject to any disclaimer, the term of this patent is extended or adjusted under 35 U.S.C. 154(b) by 85 days.

(21) Appl. No.: 14/873,037

(22) Filed: Oct. 1, 2015

(65) Prior Publication Data
US 2016/0100172 A1 Apr. 7, 2016

(30) Foreign Application Priority Data
Oct. 7, 2014 (GB) .................................. 1417710.9

(51) Int. Cl.
*H04N 19/172* (2014.01)
*H04N 19/127* (2014.01)
*H04N 19/137* (2014.01)
*H04N 19/174* (2014.01)
*H04N 19/142* (2014.01)
*H04N 19/46* (2014.01)

(52) U.S. Cl.
CPC ......... *H04N 19/127* (2014.11); *H04N 19/137* (2014.11); *H04N 19/174* (2014.11); *H04N 19/142* (2014.11); *H04N 19/46* (2014.11)

(58) Field of Classification Search
CPC .... H04N 19/142; H04N 19/46; H04N 19/174; H04N 19/137; H04N 19/127
USPC .................................................... 375/240.01
See application file for complete search history.

(56) References Cited

U.S. PATENT DOCUMENTS

| | | | | |
|---|---|---|---|---|
| 5,861,922 A | * | 1/1999 | Murashita | H04N 9/8047 375/240.24 |
| 6,304,297 B1 | | 10/2001 | Swan | |
| 6,434,196 B1 | | 8/2002 | Sethuraman et al. | |
| 7,672,005 B1 | | 3/2010 | Hobbs et al. | |
| 7,747,086 B1 | * | 6/2010 | Hobbs | G06T 9/004 382/232 |
| 8,855,414 B1 | * | 10/2014 | Hobbs | G06T 9/00 382/166 |
| 2005/0066083 A1 | * | 3/2005 | Chan | H04N 9/8042 710/52 |
| 2007/0132771 A1 | * | 6/2007 | Peer | G06F 3/14 345/545 |
| 2010/0061448 A1 | * | 3/2010 | Zhou | H04L 65/602 375/240.03 |

(Continued)

FOREIGN PATENT DOCUMENTS

GB  2474114  4/2011

OTHER PUBLICATIONS

Zhao et al. "Macroblock Skip-Mode Prediction for Complexity Control of Video Encoders". The Institution of Electrical Engineers. 2003. pp. 5-8.*

(Continued)

*Primary Examiner* — Zhihan Zhou

(74) *Attorney, Agent, or Firm* — Vierra Magen Marcus LLP

(57) ABSTRACT

A data processing system comprises a video processor (3). The data processing system is configured to, when a new frame (10) is to be encoded by the video processor (3), determine for a sub-region of a set of plural sub-regions that the new frame (10) is divided into, whether the sub-region has changed from a previous frame (11), and to control the encoding operation for the new frame (10) on the basis of the determination, e.g. to avoid performing motion estimation.

18 Claims, 3 Drawing Sheets

(56) References Cited

U.S. PATENT DOCUMENTS

| | | | | |
|---|---|---|---|---|
| 2010/0195733 | A1* | 8/2010 | Yan | H04N 19/139 375/240.16 |
| 2011/0074800 | A1 | 3/2011 | Stevens et al. | |
| 2011/0080419 | A1* | 4/2011 | Croxford | G09G 5/393 345/531 |
| 2013/0128948 | A1* | 5/2013 | Rabii | H04N 19/12 375/240.01 |
| 2013/0259132 | A1* | 10/2013 | Zhou | H04L 65/602 375/240.16 |
| 2013/0272394 | A1 | 10/2013 | Brockmann et al. | |
| 2014/0099039 | A1* | 4/2014 | Kouno | G06T 9/00 382/232 |

OTHER PUBLICATIONS

GB Search Report dated Apr. 7, 2015, GB Patent Application No. GB1417706.7.

Edsö, U.S. Appl. No. 14/873,030, filed Oct. 1, 2015, titled Data Processing Systems.

Amendment dated Oct. 2, 2017, U.S. Appl. No. 14/873,030, filed Oct. 1, 2015.

Office Action dated Jun. 2, 2017, U.S. Appl. No. 14/873,030, filed Oct. 1, 2015.

Lin, et al., "Exploring Reusable Frame Buffer Data for MPEG-4 Video Decoding", Circuits and Systems, ISCAS 2006, Proceedings 2006 IEEE International Symposium on IEEE, May 2006.

Lin, et al., "Frame Buffer Access Reduction for MPEG Video Decoder", IEEE Transactions on Circuits and Systems for Video Technology, vol. 18, No. 10, Oct. 2008.

Final Office Action dated Jan. 5, 2018, U.S. Appl. No. 14/873,030, filed Oct. 1, 2015.

Office Action dated Aug. 9, 2018, U.S. Appl. No. 14/873,030, filed Oct. 1, 2015.

Amendment dated Jul. 5, 2018, U.S. Appl. No. 14/873,030, filed Oct. 1, 2015.

Response to Office Action dated Nov. 9, 2018, U.S. Appl. No. 14/873,030, filed Oct. 1, 2015.

* cited by examiner

DATA PROCESSING SYSTEMS

BACKGROUND

The technology described herein relates to methods of and apparatus for encoding video data, and in particular to differential encoding techniques.

As is known in the art, differential encoding involves comparing portions of data with one another and using information relating to the differences between the portions of data rather than the entire data portions themselves to represent the "original" data. This has the advantage that a smaller volume of data is required to encode a given amount of original data, which can be important where, for example, the data transmission capacity is restricted.

Such differential encoding techniques are particularly suitable for the compression of (digital) video data, because although there may be 25 to 30 video frames per second, within a given scene in a video sequence, each frame will typically be very similar to the adjacent frames, with the differences only often being due to "objects" in the frames moving to different positions. This means that much of the video data necessary to reproduce successive frames in a video sequence is substantially identical as between frames.

The MPEG video compression standards and other related algorithms, for example, therefore use differential encoding to compress video data, e.g. for transmission or storage purposes.

Generally, in differential encoded video data each video frame is divided into a plurality of blocks (16×16 pixel blocks in the case of MPEG encoding) and each block of the frame is encoded individually. Three types of data "block" are usually used (e. g. stored or transmitted). These are commonly referred to as INTRA (I) blocks, INTER (P) blocks and bi-directionally predicted (B) blocks.

INTRA (I) blocks are coded frame blocks that are predicted from the same frame only, i.e. are not dependent on previous (or future) frame blocks. INTER (P) blocks and bi-directionally predicted (B) blocks are differentially coded frame blocks that describe the differences between the "current" block and a "prediction" frame block created from video data in frames before the current frame, and, in the case of B blocks, also video data in frames generated after the current frame. The "prediction" frame block that the differences encoded in P and B blocks are referenced to could, for example, simply comprise a preceding I frame block, or could be a more complex frame block predicted, e.g., from an I block and one or more preceding P blocks.

As in such arrangements P and B blocks only contain data relating to differences between blocks in frames in the original video data, they are considerably smaller than I blocks, and so the overall amount of data that must be transmitted or stored can be reduced by using P and/or B blocks to encode the data. (However, I blocks must still be stored or transmitted at intervals to allow the complete original data to be reconstructed.)

As is known in the art, an important aspect of such differential encoding of video data is identifying which areas of the video frames being compared are most similar to each other (such that there is then a reduced or minimum number of differences to be encoded). This process is complicated by the fact that, typically, the area of the "prediction" (reference) frame that most closely matches a given block or area in the current frame will not be in the same position within the reference frame as that area is in the current frame. This is because the most closely matching areas in the video frames will tend to move between frames, as objects in the video sequence move around.

Differential encoding of video data typically therefore involves two aspects: firstly identifying the location in a "reference" video frame of the area in that frame that most closely matches the area (block) of the video frame currently being encoded, and then determining the differences between the two areas in the two frames (i.e. the current and the reference frame).

The encoded data accordingly usually comprises a vector value pointing to the area of a given reference frame to be used to construct the appropriate area (block) of the frame currently being constructed, and data describing the differences between the two areas. This thereby allows the video data for the area of the frame currently being constructed to be constructed from video data describing the area in the reference frame pointed to by the vector value and the difference data describing the differences between that area and the area of the video frame currently being constructed.

The process of identifying which areas in different video frames most (or sufficiently) closely match and accordingly determining the vector to be stored to point to the relevant area in the reference video frame is usually referred to as "motion estimation". This process is usually carried out by comparing video data values (usually luminance values) for each pixel in a given area or block (typically a 16×16 pixel block in MPEG systems) of the video frame currently being encoded with a succession of corresponding-sized pixel blocks in the reference video frame until the closest (or a sufficiently close) match in terms of the relevant video data values is found. The vector pointing to the so-identified pixel block in the reference frame is then recorded and used for the encoded data stream. The relative closeness or match between relevant video data for the pixel blocks being compared is assessed using difference comparison or cost functions, such as a mean-squared difference (MSD) function.

However, because they require a comparison between a large number of pixel video data values (e. g. 256 pixel values where 16×16 pixel blocks are being tested), such "motion estimation" processes are computationally intensive, even if the range of the search over the reference frame (i.e. the region of the reference frame over which the search for the closest matching frame area is carried out) is deliberately limited.

The data that describes the differences between the two areas in the two frames (i.e. the current and the reference frame) is typically represented in the encoded data stream as a set of frequency coefficients. The process of calculating the appropriate frequency coefficients typically involves performing a frequency transform operation, such as a discrete cosine transform. Again, this operation can be computationally expensive.

These computational expensive operations can be disadvantageous generally, but particularly are so where the processing power of the encoding system may be limited. This could, e.g., particularly be the case where it is desired to encode "real time" video data using, e.g., a mobile device that may accordingly have limited processing capacity.

The Applicants believe therefore that there remains scope for improvements to differential encoding techniques.

BRIEF DESCRIPTION OF THE DRAWINGS

A number of embodiments of the technology described herein will now be described by way of example only and with reference to the accompanying drawings, in which.

DETAILED DESCRIPTION

Figure 1:
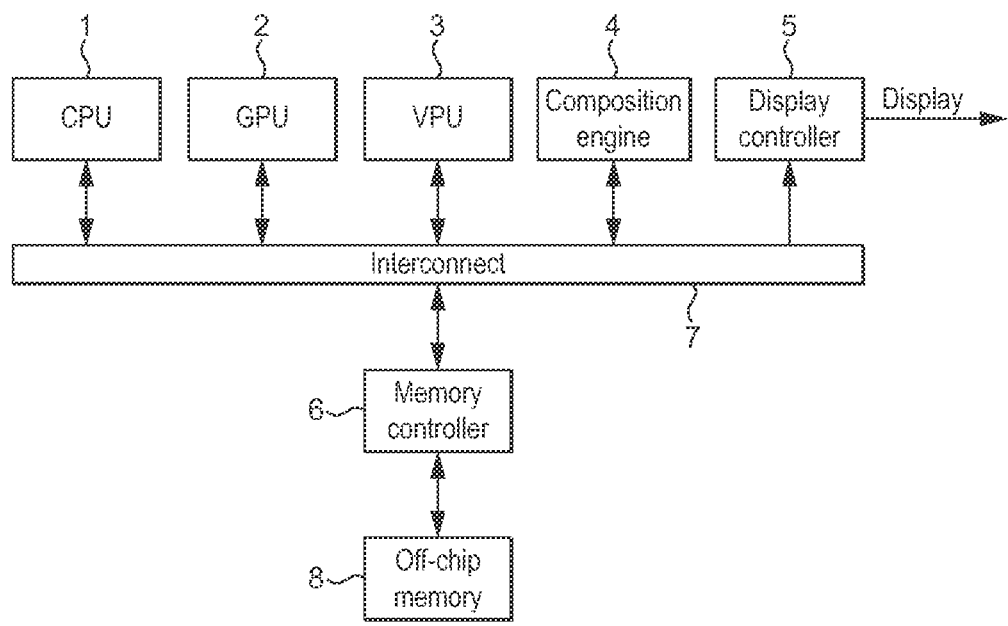
FIG. 1 shows schematically a media processing system which may be operated in accordance with the technology described herein.

A first embodiment of the technology described herein comprises a method of encoding frames of video data, the method comprising:
when a new frame is to be encoded:
determining for a sub-region of a set of plural sub-regions that the new frame is divided into, whether the sub-region has changed from a previous frame; and
controlling at least a part of the encoding operation for the new frame on the basis of the determination.

A second embodiment of the technology described herein comprises a video processing system, comprising:
a video processor;
wherein the video processing system is configured to, when a new frame is to be encoded by the video processor:
determine for a sub-region of a set of plural sub-regions that the new frame is divided into, whether the sub-region has changed from a previous frame; and
control at least a part of the encoding operation for the new frame on the basis of the determination.

The technology described herein relates to arrangements in which a video processor encodes video frames. In the technology described herein, when a new frame is to be encoded, it is determined for a sub-region of a set of plural sub-regions that the new frame is divided into, whether the sub-region has changed from a previous frame. The encoding operation for the new frame is controlled on the basis of the determination. Thus, in embodiment, the encoding operation for the new frame is dynamically controlled on the basis of a determination of whether or not a particular sub-region of the new frame has changed. As will be discussed in more detail below, this then means that the encoding operation can be controlled to reduce the processing and/or memory bandwidth required, e.g. by omitting some or all of the processing for those sub-regions of the frame that are determined not to have changed, thereby causing savings in power and bandwidth, and increasing performance.

The encoding that is used in the technology described herein may be any suitable and desired encoding technique. One particularly suitable technique for encoding is differential encoding. Video encoding standards that employ differential encoding include MPEG, H.264, and the like. The encoding is in an embodiment carried out by a video processor.

The sub-regions in the set of sub-regions that the frame is divided into for the purpose of the technology described herein can each represent any suitable and desired sub-region (area) of the frame. So long as the frame is divided or partitioned into a plurality of identifiable smaller regions each representing a part of the overall frame that can be identified, then the sub division of the frame into sub-regions can be done as desired.

Each frame sub-region should represent a different part (sub-region) of the frame, such as a plurality of pixels within the frame. Suitable sub-region sizes would be, e.g., 8×8, 16×16 or 32×32 pixels in the frame (as is known in the art, each frame will essentially be generated as an array of pixel (e.g. colour) values, each representing a respective position in the frame).

The set of sub-regions is in an embodiment predetermined (i.e. the frame (and each frame) is in an embodiment divided into a predetermined set of plural sub-regions for the purposes of the technology described herein). In an embodiment the frames are divided into a fixed, predetermined set of regions (in an embodiment independent of the size of the frames).

In one embodiment, the frames are divided into regularly sized and shaped sub-regions (e.g. blocks of data), in an embodiment in the form of squares or rectangles.

In one embodiment, each frame sub-region corresponds to a block of pixel data that the video processor that is encoding the frame operates on (thus each frame sub-region in an embodiment corresponds to a (single) video macroblock).

Thus, in an embodiment, the determination comprises determining for a block of data of a set of plural blocks of data that the new frame is divided into for encoding purposes, whether the block of data has changed from the previous frame.

In another embodiment, the frame sub-regions that are considered in the technology described herein each correspond to a set of plural pixel blocks (macroblocks), in an embodiment an integer set of pixel blocks. This may reduce the amount of "change determinations" that need to be carried out, albeit at the expense of a lower resolution (more coarse grained) division of the frames.

In one such embodiment, if it is determined that a sub-region comprising a set of plural blocks has changed from the previous frame, it may be assumed (determined) for the purposes of the technology described herein that each of the plural blocks has changed from the previous frame. Correspondingly, if it is determined that a sub-region comprising a set of plural blocks has not changed from the previous frame, it is in an embodiment determined that each of the plural blocks has not changed from the previous frame.

The same sub-region configuration (size and shape) is in an embodiment used across the entire frame.

The previous frame with respect to which it is determined whether the sub-region of the new frame has changed may be any suitable such frame that is generated before the new frame. The previous frame may be the frame that immediately precedes the new frame, or it may be an earlier frame. In an embodiment, the previous frame is the reference frame, i.e. the frame to which the motion vector or motion vectors of the sub-region refer to.

The determination of whether a sub-region has changed from the previous frame may be carried out in any manner as desired.

In an embodiment, it is determined whether multiple sub-regions, and in an embodiment all sub-regions, of the set of plural sub-regions that the new frame is divided into have changed from the previous frame. The determination of whether multiple sub-regions have changed from the previous frame may comprise making the determination for the multiple sub-regions together, and/or as a sequence of multiple determinations of whether each sub-region has changed from the previous frame, i.e. in an embodiment it is determined whether multiple (all) sub-regions of the set of plural sub-regions that the new frame is divided into have changed from the previous frame by determining whether each sub-region has changed from the previous frame on a sub-region by sub-region basis.

In one embodiment, determining whether the sub-region has changed from the previous frame comprises reading and/or examining information indicating whether the sub-region has changed from the previous frame. In one such embodiment, information indicating whether the sub-region has changed is read by the video processor and/or provided to the video processor, e.g. in advance of the encoding operation, and the video processor in an embodiment uses the information to control the encoding operation for the new frame.

In one embodiment, information indicating for the set of plural sub-regions that the new frame is divided into, which of those sub-regions have changed from the previous frame is read by and/or provided to the video processor, in an embodiment in advance of the encoding operation, and the video processor in an embodiment uses the information to control the encoding operation for the new frame.

In this embodiment, the information indicating which sub-regions of the set of sub-regions that the frame is divided into have changed from the previous frame can be configured as desired. In an embodiment this is in the form of a bitmap (an array of bits) with each bit representing a respective sub-region in the frame. Each bit can then be set to indicate whether the sub-region that it represents has changed or not. In an embodiment sequential bits in the array represent sequential sub-regions of the frame, i.e. the bits are in an embodiment arranged in the array in the order in which the sub-regions are (to be) processed. This is a particularly convenient mechanism for providing the sub-region information. The video processor can then read this sub-region map as an input to its encoding process.

Thus, where the sub-regions that the frame is divided into for this purpose correspond to individual pixel blocks that the video processor encodes, the sub-region information is in an embodiment in the form of a pixel block (a macroblock) bitmap, with each bit representing a pixel block in the frame (and, in an embodiment, sequential bits representing sequential pixel blocks, i.e. in the order in which the pixel blocks are to be encoded).

Other arrangements would, of course, be possible.

The information indicating whether the sub-region has changed from the previous frame can be provided to or read by the video processor in any suitable manner as desired. Such information may already exist, or may already have been calculated, e.g. as part of an operation that the video processing system already carries out. Such information may be provided to or read by the video processor separately or along with the data representing the new frame to be encoded. In one embodiment, the information is associated with the new frame to be encoded. For example, the information may form part of the data representing the frame to be encoded, e.g. as a sideband. The information is in an embodiment provided to or read by the video processor along with or as part of the new frame to be encoded.

The information indicating whether the sub-region has changed from the previous frame that is provided to or read by the video processor can be determined by any suitable component or element of the overall data processing system, such as by the element, e.g. graphics processing unit, that is generating the frames, by a processor (e.g. CPU) that is configured to analyse the frames for this purpose (or otherwise), etc.

In an embodiment, determining whether a sub-region has changed from the previous frame comprises the video processor calculating whether the sub-region has changed from the previous frame, and in an embodiment calculating which sub-regions of the set of sub-regions that the frame has been divided into have changed from the previous frame.

Calculating whether the sub-region has changed from the previous frame may be carried out in any manner as desired (both where the video processor calculates whether a sub-region has changed from the previous frame, and where information indicating whether a sub-region has changed from the previous frame is provided to or read by the video processor).

Where, for example, a record is kept of which areas of a frame have been written to as the new frame is generated, then that information can be used to determine whether the sub-region has changed, and in an embodiment to determine which sub-regions of the set of sub-regions have changed. In this case, the information would accordingly be determined and generated from a list of, e.g., dirty rectangles (dirty regions) (and in an embodiment this is what is done). In this case, the determination of whether the sub-region has changed will accordingly in an embodiment comprise converting a screen space area indication of written parts of a frame, to one or more sub-region indications within the frame.

In an embodiment, determining whether the sub-region has changed from the previous frame comprises comparing the sub-region in the new frame with a corresponding sub-region in the previous frame to determine whether the sub-region has changed, and in an embodiment comparing respective sub-regions in the frames to determine which sub-regions (if any) have changed between the frames.

In these arrangements, the previous and new versions of the frame can be compared in any suitable and desired manner to determine the sub-region or sub-regions that have changed. In an embodiment each respective pair of sub-regions (one from each frame) is compared, to determine if that sub-region has changed or not.

The comparison of a sub-region in the new frame with the corresponding sub-region in the previous frame should be so as to determine whether the new sub-region is the same as (or at least sufficiently similar to) the previous sub-region or not. This can be done in any suitable and desired manner. Thus, for example, some or all of the content of the new sub-region may be compared with some or all of the content of the previous sub-region (and in one embodiment this is done).

The comparison process may, e.g., require an exact match for the sub-regions to be considered to match (to have not changed), or only a sufficiently similar (but not exact) match, e.g., that exceeds a given threshold, could be required for the sub-regions to be considered to match.

In an embodiment, the comparison is performed by comparing information representative of and/or derived from the content of the new sub-region with information representative of and/or derived from the content of the version of the sub-region in the previous frame, e.g., and in an embodiment, to assess the similarity or otherwise of the sub-regions.

Thus, in an embodiment, information representative of and/or derived from the content of each frame sub-region is generated for each frame sub-region that is to be compared. Such information may be generated by the video processor during the encoding operation. However, in an embodiment, the information is generated before the encoding operation, in an embodiment by another component or element of the overall data processing system, such as by the element, e.g. graphics processing unit, that is generating the frames, by a processor (e.g. CPU) that is configured to analyse the frames for this purpose (or otherwise), by a display compositor, etc. The information is in an embodiment read (e.g. by the video processor) when it is required.

Thus, in an embodiment, determining whether a sub-region has changed from the previous frame comprises: reading first information representative of and/or derived from the content of the sub-region; reading second information representative of and/or derived from the content of the corresponding sub-region in the previous frame; and comparing the first information with the second information, in an embodiment to assess the similarity or otherwise of the sub-regions.

The information representative of the content of the sub-regions is in an embodiment in the form of information representative of the content of each sub-region (e.g. pixel block). This information for each frame sub-region (e.g. pixel block) may take any suitable form, but is in an embodiment based on or derived from the content of the respective frame sub-region. In an embodiment it is in the form of a "signature" for the frame sub-region which is generated from or based on the content of the frame sub-region. Such a frame sub-region content "signature" may comprise, e.g., and in an embodiment, any suitable set of derived information that can be considered to be representative of the content of the frame sub-region, such as a checksum, a CRC, or a hash value, etc., derived from (generated for) the data for the frame sub-region. Suitable signatures would include standard CRCs, such as CRC32, or other forms of signature such as MD5, SHA 1, etc.

Thus, in an embodiment, a signature indicative or representative of, and/or that is derived from, the content of each frame sub-region is generated for each frame sub-region that is to be compared, and the comparison process comprises comparing the signatures of the respective frame sub-regions.

Thus, in an embodiment, the technology described herein comprises comparing a signature representative of the content of a sub-region (e.g. a pixel block) of a new version of a frame to be encoded with a signature for the corresponding frame sub-region (e.g. pixel block) for the previous frame, and generating information indicating whether the frame sub-region has changed or not based on the comparison. This is in an embodiment repeated for each sub-region that the frame is divided into.

The encoding operation for the new frame may be controlled on the basis of the determination of whether a frame sub-region has changed in any desired and suitable manner.

In an embodiment, it is determined whether at least a part of the encoding operation for the new frame can be omitted on the basis of the ("change") determination, and at least a part of the encoding operation for the new frame is in an embodiment omitted or not omitted (i.e. not performed or performed) on that basis.

In one embodiment, if it is determined that at least one sub-region of the set of plural sub-regions has not changed from the previous frame, then the encoding operation is controlled such that at least a part of the processing for the encoding operation, i.e. of the "full" encoding operation that would normally be carried out for a new frame, is omitted (not performed) for the new frame. Equally, in this embodiment, if it is determined that all of the sub-regions of the set of plural sub-regions have changed from the previous frame, then the encoding operation is in an embodiment controlled such that the new frame is subjected to the "full" encoding operation, i.e. none of the processing for the encoding operation is omitted for the new frame.

In another embodiment, the encoding operation is controlled such that at least a part of the processing for the encoding operation is omitted for the new frame only if a minimum threshold number of plural sub-regions are determined not to have changed. Thus, in this embodiment, if it is determined that at least a threshold number of plural sub-regions of the set of plural sub-regions have not changed from the previous frame, then the encoding operation is controlled such that at least a part of the processing for the encoding operation, i.e. of the "full" encoding operation that would normally be carried out for a new frame, is omitted (not performed) for the new frame. Equally, in this embodiment, if it is determined that less than the threshold number of sub-regions of the set of plural sub-regions have changed from the previous frame, then the encoding operation is in an embodiment controlled such that the new frame is subjected to the "full" encoding operation, i.e. none of the processing for the encoding operation is omitted for the new frame. The threshold number can be chosen as desired.

In one embodiment, the encoding operation is controlled such that at least a part of the processing for the encoding operation for those sub-regions (for the blocks corresponding to those sub-regions) that are determined not to have changed is omitted. Equally, in this embodiment, the encoding operation is in an embodiment controlled such that the "full" encoding operation is performed for those sub-regions (for the blocks corresponding to those sub-regions) that are determined to have changed, i.e. none of the processing for the encoding operation is omitted for these sub-regions (for the blocks corresponding to those sub-regions).

Thus, in an embodiment, the encoding operation for the new frame is controlled by omitting at least a part of the processing for the encoding operation if it is determined that at least one sub-region (or plural sub-regions) of the set of plural sub-regions has not changed from the previous frame, and in an embodiment by omitting at least a part of the processing for the encoding operation for those sub-regions (for the blocks corresponding to those sub-regions) that are determined not to have changed. As discussed above, this then means that the total amount of processing required by the encoding operation can be reduced, thereby causing savings in power and increasing performance.

In these embodiments, where at least a part of the processing for an encoding operation is to be omitted, some or all of the processing for the encoding operation may be omitted, as appropriate.

In one embodiment, where the encoding is differential encoding, the motion estimation operation is omitted (not performed) for some or all (and in an embodiment for all) of the sub-regions of the set of plural sub-regions (for the blocks corresponding to those sub-regions) that are determined not to have changed. In this regard, the Applicants have recognised that the motion vector produced by a motion estimation operation for a block that has not changed from the previous frame can in many cases be predicted, and that it is not therefore necessary to calculate the motion vector for the block.

For example, where the previous frame with respect to which it is determined whether the new sub-region has changed is the reference frame, and it is determined that a block (that corresponds to the sub-region) has not changed from the previous frame, the motion vector for the block will be indicative of no motion, i.e. zero or (0, 0). Where the previous frame with respect to which it is determined whether the new sub-region has changed is not the reference frame, if it is determined that a block (that corresponds to the sub-region) has not changed from the previous frame, then the motion vector for the block will be identical to the motion vector for the corresponding block in the previous frame.

It would also be possible to derive the motion vector across multiple frames. For example, where the previous frame is not the reference frame, if it is determined that a block has not changed from the previous frame and the corresponding block or blocks in the previous frame and in the frame or frames between the reference frame and the previous frame are also identical to (or sufficiently similar to) the reference frame block, then the motion vector will be indicative of no motion.

Accordingly, as the result of the motion estimation operation can in such cases be predicted, it does not need to be carried out, and the total amount of processing required by the encoding operation can thereby be reduced.

Thus, in an embodiment, where the previous frame is the reference frame, the motion estimation operation is omitted (not performed) for the pixel blocks that correspond to the sub-regions of the set of plural sub-regions that are determined not to have changed. In an embodiment, where the previous frame is not the reference, the motion estimation operation is omitted (not performed) for the pixel blocks that correspond to the sub-regions of the set of plural sub-regions that are determined not to have changed. Similarly, in an embodiment, where the previous frame is not the reference frame, the motion estimation operation is omitted (not performed) for the pixel blocks that correspond to the sub-regions of the set of plural sub-regions that are determined not to have changed and for which the block or blocks (sub-regions) in the intermediate frames have not changed from the reference frame.

Thus, in an embodiment, the motion estimation operation of the video encoding process is omitted (not performed) for the pixel blocks that correspond to sub-regions of the frame that are determined not to have changed.

In these embodiments, a predicted motion vector, e.g. a motion vector indicative of no motion (i.e. a motion vector of zero) or the motion vector for the corresponding block in the previous frame, is in an embodiment used in the encoded data stream for those pixel blocks for which the motion estimation operation is not performed.

(The motion estimation operation should be, and in an embodiment is still performed for the pixel blocks that correspond to any sub-regions of the set of plural sub-regions that are determined to have changed.)

As discussed above, a motion estimation operation typically involves comparing the pixel block currently being encoded with a succession of corresponding-sized pixel blocks in a reference video frame. As part of this process, the video processor must read from external (main) memory data for the reference frame, e.g. including the pixel blocks of the reference frame that are to be compared with the current pixel block.

The Applicants have recognised that, where as discussed above, the motion estimation operation is omitted, at least a part of the read operation of the reference frame data can also be omitted.

Thus, in one embodiment, the encoding operation is controlled such that at least a part of the reference frame data is not read for those sub-regions that are determined not to have changed and/or for those pixel blocks for which the motion estimation operation is omitted (not performed). Equally, in this embodiment, the encoding operation is in an embodiment controlled such that all of the (relevant) reference frame data is read for those sub-regions that are determined to have changed and/or for those pixel blocks for which the motion estimation operation is to be performed.

Thus, in an embodiment, the encoding operation for the new frame is controlled on the basis of the determination by not reading (by omitting reading) at least a part of the reference frame data for those sub-regions that are determined not to have changed and/or for those pixel blocks for which the motion estimation operation is not performed. This then means that the total amount of read operations required for the encoding operation can be reduced, thereby causing savings in power and bandwidth.

In these embodiments, where at least a part of the reference frame data is not to be read, some or all of the reference frame data may not be read.

In one embodiment, where the motion estimation operation for a given pixel block requires pixel data surrounding the corresponding pixel block in the reference frame to be read, if it is determined that a sub-region comprising the given pixel block has not changed from the previous frame, the surrounding pixel data is not read. Additionally or alternatively, for a sub-region of the new frame that is determined not to have changed from the previous frame, margin data for the reference frame, e.g., that is normally used in the motion estimation operation, is not read.

In one embodiment, for a sub-region of the new frame that is determined not to have changed from the previous frame, no data (at all) is read for the reference frame. This may be done, for example, if it can be determined that no residual will be generated for the block, and that the reference buffer already contains the appropriate pixel data. However, in an alternative embodiment, if it is determined that a sub-region comprising a given pixel block has not changed from the previous frame, when encoding the given pixel block, only the pixel block in the reference frame corresponding to the given pixel block is read, e.g. if necessary for the encoding operation for the given pixel block (e.g. if necessary for calculating the residual and/or for updating the reference buffer, where the reference buffer does not currently contain the appropriate pixel data).

In one embodiment, the encoding operation is controlled such that at least a part of the reference frame data is not updated (i.e. is not written to) for those sub-regions that are determined not to have changed and/or for those pixel blocks for which it can be determined that the reference buffer already contains the appropriate pixel data. Equally, in this embodiment, the encoding operation is in an embodiment controlled such that the reference frame data is updated for those sub-regions that are determined to have changed and/or for those pixel blocks for which the reference buffer does not contain the appropriate pixel data.

It will accordingly be appreciated that the techniques of the technology described herein can be, and are in an embodiment, used to reduce the memory bandwidth required for the video encoding operation. (As is known in the art, in video processors in lower power and portable devices, the bandwidth cost of reading data from external memory can be a significant issue. Bandwidth consumption can be a big source of heat and of power consumption, and so it is generally desirable to try to reduce bandwidth consumption for external memory reads in video processing systems.)

In another embodiment, where the encoding is differential encoding, a frequency transform operation is omitted (not performed) for some or all of the pixel blocks that correspond to the sub-regions of the set of plural sub-regions that are determined not to have changed. In this regard, the Applicants have recognised that the result of the frequency transform operation for a block that has not changed from the previous frame can in many cases be predicted, and that it is not therefore necessary to perform the frequency transform operation for the block.

For example, where the previous frame is the reference frame, if it is determined that a block has not changed from the previous frame, the difference value (and therefore the frequency coefficients) will be zero. Where the previous frame is not the reference frame, if it is known that the corresponding block in the previous frame did not generate a residual (so had reached "full" quality for the current quantiser setting), and that the block has not changed in the current frame, then the residual for the current block can be predicted also to be zero (such that the frequency transformation of the current block does not need to be performed).

Accordingly, as the result of the frequency transform can in such cases be predicted, it does not need to be carried out, and the total amount of processing required by the encoding operation can thereby be reduced.

Thus, in an embodiment, where the previous frame is the reference frame, the frequency transform operation is omitted (not performed) for the pixel blocks that correspond to the sub-regions of the set of plural sub-regions that are determined not to have changed. In an embodiment, the frequency transform operation of the video encoding process is omitted (not performed) for the pixel blocks that correspond to sub-regions of the frame that are determined not to have changed and for which the corresponding block in the previous frame did not generate a residual. To facilitate this operation, the video processor in an embodiment keeps track of the pixel blocks that did not generate a residual in the previous frame.

Thus, in an embodiment, the frequency transform operation of the video encoding process is omitted (not performed) for the pixel blocks that correspond to sub-regions of the frame that are determined not to have changed.

In an embodiment, the frequency transform operation is omitted (not performed) for those pixel blocks for which the motion estimation operation is omitted.

In these embodiments, a predicted set of frequency coefficients, e.g. zero or the set of frequency coefficients for the corresponding block in the previous frame, is in an embodiment used in the encoded data stream for those pixel blocks for which the frequency transform operation is not performed.

(The frequency transform operation should be, and in an embodiment is still performed for the pixel blocks that correspond to sub-regions of the frame that are determined to have changed and/or for the pixel blocks for which the motion estimation operation is performed.)

As discussed above, in an embodiment, a predicted motion vector is used in the encoded data stream for the pixel blocks for which the motion estimation operation is not performed. Similarly, a predicted set of frequency coefficients is in an embodiment used in the encoded data stream for the pixel blocks for which the frequency transformation operation is not performed. In an embodiment, where the predicted motion vector and the predicted set of frequency coefficients (residual) are both zero for a particular block, an individual syntax element that indicates a zero motion vector and a zero residual is used in the encoded data stream for the particular block. In an embodiment, a so-called "SKIP" syntax element is used for this purpose.

In an embodiment, a single ("SKIP") syntax element that indicates a zero motion vector and a zero residual may be used in the encoded data stream in respect of (to encode) multiple, in an embodiment consecutive, pixel blocks. In one such embodiment, if it is determined that multiple (consecutive) blocks of data of a set of plural blocks of data that the new frame is divided into have not changed from the previous frame, a single syntax element is used to encode the multiple (consecutive) blocks of data.

In one embodiment, where the previous frame is the reference frame, if it is determined that the entire frame has not changed from the previous frame, the entire frame is encoded using a single ("SKIP") syntax element that indicates a zero motion vector and a zero residual. Similarly, in an embodiment, where the previous frame is not the reference frame, if it is determined that the entire frame has not changed from the previous frame and if the previous frame and any frame or frames between the reference frame and the previous frame did not change from the reference frame either, the entire frame is encoded using a single ("SKIP") syntax element that indicates a zero motion vector and a zero residual. This then means that some or all of the processing for the encoding operation can be omitted for the entire frame.

A similar technique may also be applied to regions of a frame less than the entire frame, i.e. groups of plural pixel blocks.

In one such embodiment, where the previous frame is the reference frame, if it is determined that a group of plural blocks has not changed from the previous frame, the entire group of plural blocks is in an embodiment encoded using a single ("SKIP") syntax element that indicates a zero motion vector and a zero residual. Similarly, in an embodiment, where the previous frame is not the reference frame, if it is determined that a group of plural blocks has not changed from the previous frame and if the (corresponding) group or groups of plural blocks in the previous frame and in any frame or frames between the reference frame and the previous frame did not change from the reference frame either, the entire group of plural blocks is encoded using a single ("SKIP") syntax element that indicates a zero motion vector and a zero residual.

These embodiments are particularly advantageous where, for example, multiple video processors operate to encode in parallel separate groups of plural blocks, e.g. separate regions of a new frame or rows of plural blocks (so-called "stripes"). Advantageously, some or all of the processing for the encoding operation can be omitted for the entire group (stripe) of plural pixel blocks being processed by a particular processor.

As is known in the art, when encoding a sequence of new frames the video processor will periodically output reference frames, e.g. for use in the motion estimation operation. In an embodiment of the technology described herein, the "transaction elimination" techniques described in the Applicants' earlier application GB-2474114 are used to avoid writing pixel blocks of the reference frame that have not changed from the previous reference frame.

Thus, in an embodiment, each reference frame is written to an output buffer by writing blocks of data representing particular sub-regions of the reference frame. When a block of data is to be written to the output buffer, the block of data is in an embodiment compared to a block of data already stored in the output buffer, and a determination is made as to whether or not to write the block of data to the output buffer on the basis of the comparison.

The comparison is in an embodiment made between a signature representative of the content of the new data block and a signature representative of the content of the data block stored in the output buffer. The signatures may comprise, for example, CRCs which are in an embodiment calculated and stored for each block of data. In an embodiment, if the signatures are the same (thus indicating that the new data block and the stored data block are the same (or sufficiently similar), the new data block is not written to the output buffer, but if the signatures differ, the new data block is written to the output buffer.

This then means that the power consumed and bandwidth used can be further reduced for the encoding operation, i.e. by eliminating unnecessary reference frame output buffer write transactions.

In an embodiment, the determination of whether a sub-region has changed from a previous frame can be (and in an embodiment is) dynamically enabled and/or disabled, for example and in an embodiment based on certain criteria.

When the sub-region determination of the technology described herein is disabled, then the encoding operation in an embodiment operates in the conventional manner, i.e. to perform the "full" encoding operation. Correspondingly, the encoding operation is not controlled on the basis of the sub-region determination in the manner of the technology described herein.

When the sub-region determination of the technology described herein is enabled, then the encoding operation should operate in the manner of the technology described herein, i.e. it should be controlled on the basis of the sub-region determination.

In an embodiment, the enabling and/or disabling of the sub-region "change" determination is based on whether the frame or frames have a particular property or not. Thus, in an embodiment, when the sub-region determination of the technology described herein is disabled and/or when the sub-region determination of the technology described herein is enabled, as each new frame is encoded it is determined whether the new frame has a particular property.

The particular property determination is in an embodiment made for each and every frame which is encoded by the video processor, e.g. on a frame-by-frame basis, although this is not necessary. It could also or instead, for example, be done at regular intervals (e.g. every two or three frames, etc.). In one such embodiment, the results of the particular property determination for one frame may be "carried over" to one or more following frames.

In an embodiment, when the sub-region determination of the technology described herein is disabled, if it determined that the new frame has the particular property, then the sub-region "change" determination of the technology described herein (and correspondingly the control of the encoding operation) is enabled, e.g. for the next frame or frames to be encoded. Conversely, if it determined that the new frame does not have the particular property, then the sub-region "change" determination of the technology described herein (and correspondingly the control of the encoding operation) is not enabled, i.e. remains disabled (e.g. for the next frame or frames to be encoded).

Alternatively, the sub-region determination of the technology described herein may be enabled if plural frames, such as a consecutive sequence of plural frames, are determined to have the particular property. Thus, in an embodiment, if it determined that plural frames (and in an embodiment a consecutive sequence of plural frames) each have the particular property, then the sub-region determination of the technology described herein (and correspondingly the control of the encoding operation) is enabled, e.g. for the next frame to be encoded. In this embodiment, the number of frames having the particular property that are required to enable the sub-region determination can be selected as desired.

In an embodiment, when the sub-region determination of the technology described herein is enabled, if it determined that the new frame does not have the particular property, then the sub-region "change" determination of the technology described herein (and correspondingly the control of the encoding operation) is disabled, e.g. for the next frame or frames to be encoded. Conversely, if it determined that the new frame does have the particular property, then the sub-region "change" determination of the technology described herein (and correspondingly the control of the encoding operation) is not disabled, i.e. remains enabled (e.g. for the next frame or frames to be encoded).

Alternatively, the sub-region determination of the technology described herein may be disabled if plural frames, such as a consecutive sequence of plural frames, are determined not to have the particular property. Thus, in an embodiment, if it determined that plural frames (and in an embodiment a consecutive sequence of plural frames) each do not have the particular property, then the sub-region determination of the technology described herein (and correspondingly the control of the encoding operation) is disabled, e.g. for the next frame to be encoded. In this embodiment, the number of frames having the particular property that are required to disable the sub-region determination can be selected as desired.

The particular property may be any suitable and desired (selected) property of a frame. The particular property should be (and in an embodiment is) related to, in an embodiment indicative of, the likelihood that the sub-region determination of the technology described herein will be successful (or unsuccessful), or sufficiently successful, e.g. such that the extra cost of performing the sub-region determination for the frame may be justified. In an embodiment, if the sub-region determination of the technology described herein is sufficiently unsuccessful, e.g. such that the "full" (or near full) encoding operation is in any case performed, then the sub-region determination may be disabled.

In an embodiment, the particular property is related to whether or not (and/or the extent to which) the frame has changed relative to a previous frame. In an embodiment, if the frame is determined to have not changed by more than a particular, in an embodiment selected amount, from a previous frame, the frame is determined to have the particular property (and vice-versa). Thus, determining whether a new frame has a particular property in an embodiment comprises determining whether the new frame has changed relative to a previous frame.

In one embodiment, the frame is determined to have the particular property if at least one of the blocks of data that make up the (encoded version of the) frame has not changed relative to the previous frame. Conversely, the frame is in an embodiment determined not to have the particular property if all of the blocks of data have changed.

In an embodiment, the frame is determined to have the particular property if a sufficient number of the blocks of data that make up the frame have not changed relative to the previous frame, i.e. if the number of blocks that have not changed relative to the previous frame is greater than or equal to (or less than (or equal to)) a threshold. Conversely, the frame is in an embodiment determined not to have the particular property if the number of blocks that have not changed relative to the previous frame is less than the threshold.

Thus, in an embodiment, the frame is determined to have the particular property if a sufficient number of blocks making up the frame have not changed relative to the previous frame, i.e. in an embodiment with respect to a threshold (and vice versa).

In an embodiment, whether or not a particular block has changed relative to the previous frame is determined by examining the results of the encoding operation. In one such embodiment, this is based on the output of the motion estimation operation. In an embodiment it is be determined that a particular block has not changed relative to a previous frame if the output of the motion estimation operation for the block is a motion vector of (0, 0). Thus, in an embodiment, the sub-region "change" determination is enabled if the motion estimation process is generating more than a threshold number of (0, 0) motion vector results, and vice versa.

Additionally or alternatively, whether or not a particular block has changed relative to the previous frame is determined by examining the "syntax elements" that are (produced) to encode the block in question. (A "syntax element" is a piece of information encoded in the encoded video data stream that describes a property of properties of one or more blocks. Common such "syntax elements" include the motion vector, a reference index, e.g. which indicates which frame should be used as the reference frame (i.e. which frame the motion vector refers to), data describing the residual, etc.). For example, it may be determined that a particular block has not changed relative to a previous frame if the syntax elements that are to encode the block comprise and/or indicate a motion vector of (0, 0) and a residual of zero.

As will be appreciated, by dynamically enabling/disabling the sub-region "change" determination appropriately in this manner, the power and/or bandwidth requirements of the system can be further reduced.

Although the technology described herein has been described above primarily with reference to encoding one new frame, as will be appreciated by those skilled in the art, this process can be, and in an embodiment is, repeated for a sequence of plural frames that are to be encoded, and in an embodiment as each successive new frame is encoded.

The technology described herein can be implemented in any suitable system, such as a suitably configured microprocessor based system. In an embodiment, the technology described herein is implemented in a computer and/or micro-processor based system.

The video processing system of the technology described herein in an embodiment comprises one or more processors, central processing units (CPU), graphics processing units (GPU) or other frame generators for generating new frames which are to be encoded by the video processor. The video processing system in an embodiment comprises and/or is in communication with, one or more memories and/or memory devices that store the data described herein, and/or software for performing the processes described herein.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the video processor can otherwise include any one or more or all of the usual functional units, etc., that video processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a video processor or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically an arrangement of a media processing system that can operate in accordance with the technology described herein. The media processing system comprises a central processing unit (CPU) 1, graphics processing unit (GPU) 2, video processing unit or codec (VPU) 3, composition engine 4, display controller 5 and a memory controller 6. As shown in FIG. 1, these communicate via an interconnect 7 and have access to off-chip main memory 8.

The graphics processor or graphics processing unit (GPU) 1, as is known in the art, produces rendered tiles of an output frame intended for display on a display device, such as a screen. The output frames are typically stored, via the memory controller 6, in a frame or window buffer in the off-chip memory 8.

The video processor or video processing unit (VPU) 3, as is known in the art, may operate to encode and/or decode blocks of pixel data. Output frames are typically stored, via the memory controller 6, in an output buffer in the off-chip memory 8.

The composition engine 4, as is known in the art, can generate composited output frames from one or more input frames (e.g. generated by the GPU 2 and/or VPU 3 and stored in one or more window buffers). The composited output frames are typically stored, via the memory controller 6, in a frame buffer in the off-chip memory 8.

The display controller 5 operates to read an output frame from the frame buffer in the off-chip memory 8 via the memory controller 6 and to send it to a display for display.

In the present embodiment, the video processor 3 operates to encode successive frames of video data using differential encoding. The successive frames of video data may be generated by the CPU 1, the GPU 2 and/or the VPU 3. Each frame comprises a plurality of pixels, and is divided into a set of plural 16×16 pixel blocks.

In the present embodiment, for each new frame to encoded, it is determined which pixel blocks of the set of pixel blocks that the frame is divided into have changed from the previous frame by comparing respective pixel blocks in successive frames.

Figure 2:
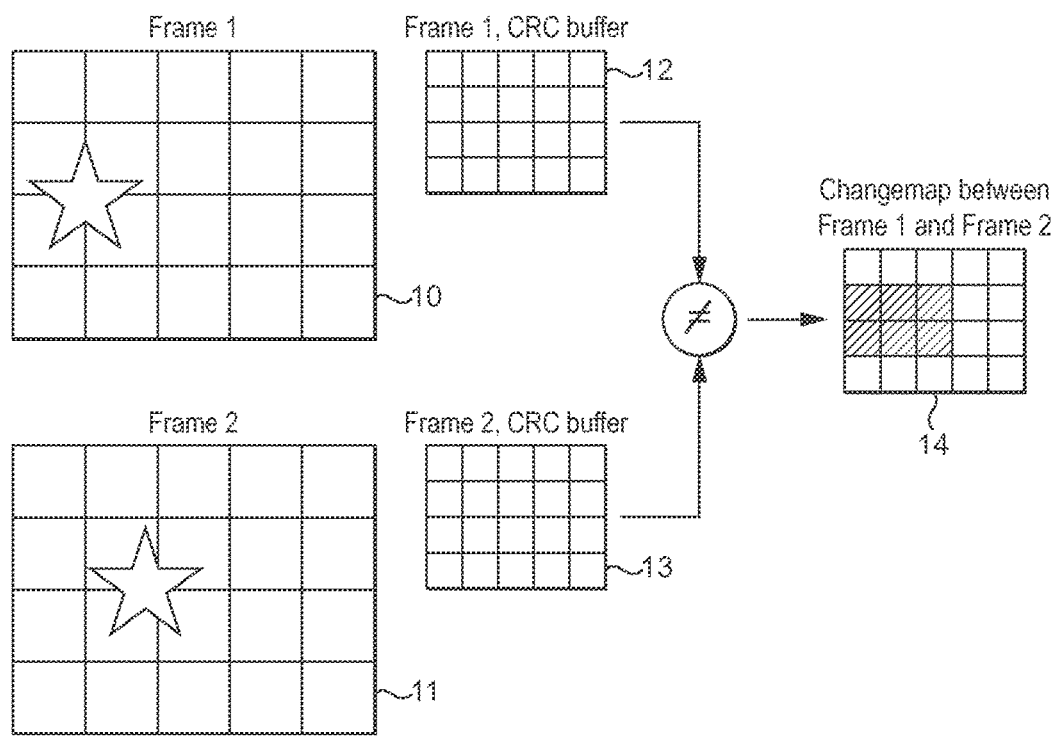
FIG. 2 shows schematically a method of determining, for a new frame, information indicating which sub-regions have changed from the previous frame, in accordance with an embodiment of the technology described herein.

This is illustrated in FIG. 2. A new frame 10 and the previous frame 11 are each divided into a 4×4 set of pixel blocks. For each pixel block, a signature indicative or representative of, and/or that is derived from, the content of the pixel block is generated. These are stored in a first signature buffer 12 and a second signature buffer 13. Such pixel block content "signatures" could comprise, e.g., a checksum, a CRC, or a hash value, etc., derived from (generated for) the data for the pixel block. Suitable signatures would include standard CRCs, such as CRC32, or other forms of signature such as MD5, SHA 1, etc. The signatures could be generated, e.g., by the host CPU as the pixel blocks are generated.

The signatures of the respective pixel blocks are compared, and a determination is made as to whether or not each pixel block of the new frame has changed relative to the previous frame. A "change map" 14 is then generated based on the comparisons, i.e. a bitmap (an array of bits) with each bit representing a respective pixel block in the frame, where each bit is set to indicate whether the pixel block that it represents has changed or not.

The change map 14 is then used by the video processor 3 when encoding the new frame 10 to control the encoding process.

Figure 3:
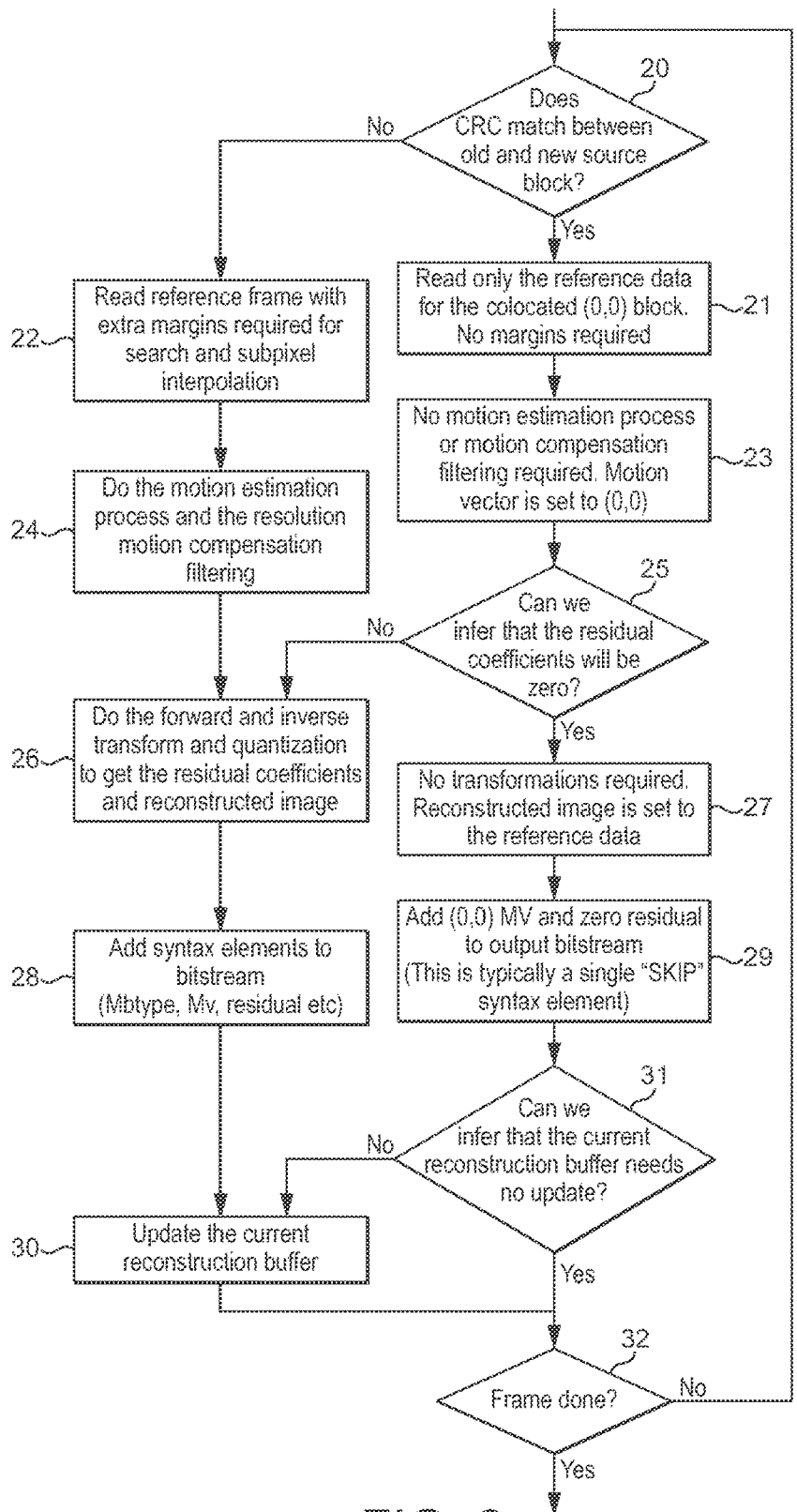
FIG. 3 shows schematically an encoding operation in accordance with an embodiment of the technology described herein.

This is illustrated by FIG. 3. The process illustrated by FIG. 3 is performed for each pixel block that the new frame to be encoded is divided into. For a particular pixel block of the new frame, a determination is made as to whether the signature for the pixel block matches the signature of the corresponding pixel block in the previous frame (step 20). In the present embodiment, this is done by consulting the change map 14.

If the signatures do not match, then the "full" encoding operation is performed for that pixel block. As shown in FIG. 3, this involves firstly reading the reference frame, including reading the margins, e.g. required for the motion estimation search operation and sub-pixel interpolation (step 22).

The motion estimation operation is then performed for the pixel block, including the resulting motion compensation filtering (step 24).

Forward and reverse transforms and quantization operations are then performed in order to obtain the frequency coefficients for the residual (the difference value) and the reconstructed image (step 26).

The appropriate syntax elements that describe the encoded pixel block are then added to the encoded data bit stream (step 28).

Finally, the current reconstruction buffer is updated (step 30).

If, on the other hand, it is determined in step 20 that the signatures for the current pixel block and the corresponding pixel block in the previous frame do match, then at least some of the above described processing for the "full" encoding operation is omitted for the current pixel block.

Thus, in the present embodiment, only the reference data for the corresponding (co-located) pixel block is read (i.e. the other pixel blocks are not read), and the margins are not read (step 21). As discussed above, in this case the memory bandwidth required for the encoding operation is reduced.

Equally, the motion estimation and motion compensation operations are omitted (not performed) for the pixel block, and instead, the motion vector used to encode the pixel block is set to a predicted value, e.g. of (0, 0) (step 23).

A determination is then made as to whether it can be inferred that the residual coefficients will be zero (step 25). This will be the case, e.g., if the corresponding previous block had a residual of zero. (In the present embodiment, the encoder keeps track of when previous blocks did not generate a residual to facilitate this.) In this case, the transformation operation is omitted (not performed), and residual will be set to zero (i.e. such that the reconstructed image will be equal to the reference data) (step 27).

The pixel block in question is then encoded with a (0, 0) motion vector and zero residual, e.g. in the form of a "SKIP" syntax element (step 29).

(If, on the other hand, it cannot be inferred at step 25 that the residual coefficients will be zero, then the forward and inverse transform and quantization operations are performed (step 26), as discussed above.)

If the pixel block is encoded with a (0, 0) motion vector and zero residual at step 29, then a determination is then made as to whether the current reconstruction buffer (i.e. the reference frame) needs to be updated (step 31). If the reconstruction buffer does need to be updated, then it is updated in step 30, as discussed above. If the reconstruction buffer does not need to be updated, then the encoding process is complete for the current pixel block.

The above process is then repeated for each pixel block of the frame until the entire frame has been encoded (step 32).

Thus, it will be appreciated that in the present embodiment, the encoding operation is controlled so as to reduce the processing and/or memory bandwidth required for the operation by omitting some or all of the processing and/or reads for those pixel blocks (sub-regions) of the frame that have not changed, thereby causing savings in power and bandwidth, and increasing performance. The techniques of the present embodiment are particularly useful where the new frame comprises a number of unchanged blocks, as will often be the case, e.g., for scenes with a static camera or rendered scenes such as text, a graphical user interface (GUI) and/or games.

Although the present embodiment has been described above primarily with reference to encoding one new frame, as will be appreciated by those skilled in the art, this process can be, and in an embodiment is, repeated for plural frames that are being encoded, and in an embodiment as each successive new frame is encoded.

A number of other alternatives and arrangements of the above embodiment and of the technology described herein could be used if desired.

For example, although in the above embodiment the changed sub-regions (pixel blocks) and the sub-region processing information (change map) is determined and generated by comparing respective sub-regions in successive frames to determine which sub-regions (if any) have changed between the frames, other arrangements for determining which sub-regions of the set of sub-regions that the frame has been divided into could have changed would be possible.

For example, the changed sub-regions and the sub-region processing information (change map) could be determined and generated from a list of, e.g., dirty rectangles (dirty regions), provided by the host processor.

In an alternative embodiment, such information may already exist, or may already have been calculated, e.g. as part of an operation that the video processing system already carries out. Such information may be associated with the new frame to be encoded, e.g. in a sideband.

In an embodiment, the determination of whether the signature for the pixel block matches the signature of the corresponding pixel block in the previous frame may be carried out by the video processor 3. In this embodiment, it will not then be necessary to generate a "change map".

Although the embodiment has been described above with reference to the use of frame sub-regions corresponding to pixel blocks, it is not necessary that the frame sub-regions that are considered correspond exactly to pixel blocks that will be encoded by the video processor. For example, the frame sub-regions that are considered could be made up of plural pixel blocks.

In this case, the frame will be divided into "coarser" sub-regions such that instead of detailing a map of every single pixel block, the frame will be divided into groups of plural pixel blocks, with motion estimation for the blocks in each such region of plural pixel blocks then being able to be enabled/disabled for a given frame. This will reduce the amount of information that needs to be passed to the video processor in terms of the "pixel block" "change map", but potentially at the expense of having to perform motion estimation for more pixel blocks.

In an arrangement where there are multiple graphics processing cores operating to encode groups of plural blocks ("stripes") of the same frame in parallel, then in an embodiment, an entire stripe may be encoded using a single SKIP element if it is determined that the entire stripe has not changed from the previous frame (where the reference frame is the previous frame). Where the reference frame is an earlier frame than the previous frame, the entire stripe may be encoded using a single SKIP element if it is determined that the entire stripe has not changed from the previous frame and if the intermediate stripe or stripes have not changed.

In one embodiment, the "transaction elimination" techniques described in the Applicants' earlier application GB-2474114 may be used to avoid writing pixel blocks of reference frames that have not changed from the previous reference frame.

In one embodiment, the determination of whether sub-regions have changed from a previous frame (and correspondingly the control of the encoding operation) can be dynamically enabled and/or disabled, for example based on a property or properties of a frame or frames being encoded, such as whether or not the output of the motion estimation operation and/or the syntax elements that encode one or more blocks of the frame or frames indicate that the frame or frames has or have changed from a previous frame.

It can be seen from the above that the technology described herein, in its embodiments at least, can help to reduce, for example, power consumption and memory bandwidth when encoding frames in a video processor.

This is achieved, in embodiments of the technology described herein at least, by providing to the video processor information indicating for a set of plural sub-regions that a new frame is divided into, which of those sub-regions have changed from the previous frame, and the video processor using the information to control the encoding operation for the new frame.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of encoding frames of video data, the method comprising:

when a new frame is to be encoded:
for a sub-region of a set of plural sub-regions that the new frame is divided into, selecting one of: (i) performing an encoding operation for the sub-region, wherein a motion estimation operation and a frequency transform operation are performed for the sub-region; (ii) performing only part of the encoding operation for the sub-region, wherein the motion estimation operation is omitted and the frequency transform operation is performed for the sub-region; and (iii) omitting the motion estimation operation and the frequency transform operation for the sub-region, by:
determining whether the sub-region has changed from a previous frame; and
controlling at least a part of the encoding operation for the new frame on the basis of the determination by:
performing the motion estimation operation and the frequency transform operation for the sub-region when the sub-region is determined to have changed from the previous frame; and
omitting the motion estimation operation for the sub-region when the sub-region is determined to be unchanged from the previous frame;
wherein the method further comprises when the sub-region is determined to be unchanged from the previous frame, determining whether the frequency transform operation should be performed or can be omitted for the sub-region by determining whether it can be inferred that frequency coefficients output by the frequency transform operation for encoding the sub-region would be zero; and
when the sub-region is determined to be unchanged from the previous frame and when it can be inferred that frequency coefficients output by the frequency transform operation for encoding the sub-region would be non-zero, performing the frequency transform operation and omitting the motion estimation operation for the sub-region; and
when the sub-region is determined to be unchanged from the previous frame and when it can be inferred that the frequency coefficients output by the frequency transform operation for encoding the sub-region would be zero, omitting the frequency transform operation and omitting the motion estimation operation for the sub-region.

2. The method of claim 1, wherein determining whether the sub-region has changed from the previous frame and controlling the encoding operation for the new frame on the basis of the determination comprises:
providing to a video processor that is encoding the video data information indicating whether the sub-region has changed from the previous frame; and
the video processor using the provided information to control at least a part of the encoding operation for the new frame.

3. The method of claim 1, wherein determining whether the sub-region has changed from the previous frame comprises a video processor that is encoding the video data calculating whether the sub-region has changed from the previous frame.

4. The method of claim 1, wherein determining whether the sub-region has changed from the previous frame comprises comparing the sub-region with the corresponding sub-region in the previous frame to determine whether the sub-region has changed.

5. The method of claim 1, wherein controlling the encoding operation comprises: when the sub-region is determined to be unchanged from the previous frame, only reading and/or writing a sub-region of reference frame data that corresponds to the sub-region of the new frame without reading and/or writing surrounding pixel data and/or margin data;
when the sub-region is determined to have changed from the previous frame, reading and/or writing a sub-region of reference frame data that corresponds to the sub-region of the new frame; and
when the sub-region is determined to have changed from the previous frame, reading and/or writing pixel data that surrounds the sub-region of reference frame data and/or margin data.

6. The method of claim 1, further comprising:
when it is determined that multiple blocks of data of a set of plural blocks of data that the new frame is divided into are unchanged from the previous frame, using a single syntax element to encode the multiple blocks of data.

7. The method of claim 1, further comprising:
generating a reference frame for use in the encoding operation; and
storing the reference frame in an output buffer by:
when a block of data representing a particular sub-region of the reference frame is to be written to the output buffer, comparing the block of data to a block of data representing a corresponding sub-region of a previous version of the reference frame already stored in the output buffer, and determining whether to write the block of data to the output buffer on the basis of the comparison.

8. The method of claim 1, further comprising:
determining for each of one or more new frames whether a threshold number of blocks of data that represent at least a portion of the new frame are unchanged relative to a previous frame; and
dynamically enabling and/or disabling the determination of whether the sub-region has changed on the basis of the determination.

9. A video processing system, comprising:
video processing circuitry; and
processing circuitry configured to, when a new frame is to be encoded:
for a sub-region of a set of plural sub-regions that the new frame is divided into, select one of: (i) performing an encoding operation for the sub-region, wherein a motion estimation operation and a frequency transform operation are performed for the sub-region; (ii) performing only part of the encoding operation for the sub-region, wherein the motion estimation operation is omitted and the frequency transform operation is performed for the sub-region; and (iii) omitting the motion estimation operation and the frequency transform operation for the sub-region, by:
determining whether the sub-region has changed from a previous frame; and
controlling at least a part of the encoding operation for the new frame on the basis of the determination by:
performing the motion estimation operation and the frequency transform operation for the sub-region when the sub-region is determined to have changed from the previous frame; and
omitting the motion estimation operation for the sub-region when the sub-region is determined to be unchanged from the previous frame;

wherein the processing circuitry is further configured to:
when the sub-region is determined to be unchanged from the previous frame, determine whether the frequency transform operation should be performed or can be omitted for the sub-region by determining whether it can be inferred that frequency coefficients output by the frequency transform operation for encoding the sub-region would be zero;
perform the frequency transform operation and omit the motion estimation operation for the sub-region when the sub-region is determined to be unchanged from the previous frame and when it can be inferred that frequency coefficients output by the frequency transform operation for encoding the sub-region would be non-zero; and
omit the frequency transform operation and omit the motion estimation operation for the sub-region when the sub-region is determined to be unchanged from the previous frame and when it can be inferred that the frequency coefficients output by the frequency transform operation for encoding the sub-region would be zero.

10. The video processing system of claim 9, wherein:
the processing circuitry is configured to provide to the video processing circuitry information indicating whether the sub-region has changed from the previous frame; and
wherein the video processing circuitry is configured to use the provided information to control at least a part of the encoding operation for the new frame.

11. The video processing system of claim 9, wherein the video processing circuitry is configured to calculate whether the sub-region has changed from the previous frame.

12. The video processing system of claim 9, wherein the processing circuitry is configured to determine whether the sub-region has changed from the previous frame by comparing the sub-region with the corresponding sub-region in the previous frame.

13. The video processing system of claim 9, wherein the processing circuitry is configured to determine whether at least a part of the encoding operation for the new frame can be omitted on the basis of the determination.

14. The video processing system of claim 9, wherein the processing circuitry is configured to control the encoding operation for the new frame by:
only reading and/or writing a sub-region of reference frame data that corresponds to the sub-region of the new frame for the encoding operation without reading and/or writing surrounding pixel data and/or margin data when the sub-region is determined to be unchanged from the previous frame;
reading and/or writing a sub-region of reference frame data that corresponds to the sub-region of the new frame when the sub-region is determined to have changed from the previous frame; and
reading and/or writing pixel data that surrounds the sub-region of reference frame data and/or margin data when the sub-region is determined to have changed from the previous frame.

15. The video processing system of claim 9, wherein the processing circuitry is configured to, when it is determined that multiple blocks of data of a set of plural blocks of data that the new frame is divided into are unchanged from the previous frame, use a single syntax element to encode the multiple blocks of data.

16. The video processing system of claim 9, wherein:
the video processing circuitry is configured to generate a reference frame for use in the encoding operation; and
the processing circuitry is configured to store the reference frame in an output buffer by:
when a block of data representing a particular sub-region of the reference frame is to be written to the output buffer, comparing the block of data to a block of data representing a corresponding sub-region of a previous version of the reference frame already stored in the output buffer, and determining whether to write the block of data to the output buffer on the basis of the comparison.

17. The video processing system of claim 9, wherein the processing circuitry is configured to:
determine for each of one or more new frames whether a threshold number of blocks of data that represent at least a portion of the new frame are unchanged relative to a previous frame; and
dynamically enable and/or disable the determination of whether the sub-region has changed on the basis of the determination.

18. A non-transitory computer readable storage medium storing computer software code which when executing on a processor performs a method of encoding frames of video data, the method comprising:
when a new frame is to be encoded:
for a sub-region of a set of plural sub-regions that the new frame is divided into, selecting one of: (i) performing an encoding operation for the sub-region, wherein a motion estimation operation and a frequency transform operation are performed for the sub-region; (ii) performing only part of the encoding operation for the sub-region, wherein the motion estimation operation is omitted and the frequency transform operation is performed for the sub-region; and (iii) omitting the motion estimation operation and the frequency transform operation for the sub-region, by:
determining whether the sub-region has changed from a previous frame; and
controlling at least a part of the encoding operation for the new frame on the basis of the determination by:
performing the motion estimation operation and the frequency transform operation for the sub-region when the sub-region is determined to have changed from the previous frame; and
omitting the motion estimation operation for the sub-region when the sub-region is determined to be unchanged from the previous frame;
wherein the method further comprises when the sub-region is determined to be unchanged from the previous frame, determining whether the frequency transform operation should be performed or can be omitted for the sub-region by determining whether it can be inferred that frequency coefficients output by the frequency transform operation for encoding the sub-region would be zero; and
when the sub-region is determined to be unchanged from the previous frame and when it can be inferred that frequency coefficients output by the frequency transform operation for encoding the sub-region would be non-zero, performing the frequency transform operation and omitting the motion estimation operation for the sub-region; and
when the sub-region is determined to be unchanged from the previous frame and when it can be inferred that the frequency coefficients output by the frequency transform operation for encoding the sub-region would be zero, omitting the frequency transform operation and omitting the motion estimation operation for the sub-region.

\* \* \* \* \*